UNITED STATES PATENT OFFICE.

CONRAD SEMPER, OF PHILADELPHIA, PENNSYLVANIA, ASSIGNOR TO HARRISON BROTHERS & CO., OF SAME PLACE.

MANUFACTURE OF SULPHATE OF ALUMINA.

SPECIFICATION forming part of Letters Patent No. 245,750, dated August 16, 1881.

Application filed June 8, 1881. (No specimens.)

*To all whom it may concern:*

Be it known that I, CONRAD SEMPER, of Philadelphia, Pennsylvania, have invented an Improvement in the Manufacture of Sulphate of Alumina, of which the following is a specification.

The object of my invention is to produce a white sulphate of alumina from ferruginous aluminous material, such as bauxite, by reducing the peroxide of iron therein to a colorless protoxide. Hitherto this reduction has been accomplished in various ways, and among others by the use of sulphurous acid or sulphureted hydrogen, introduced to a solution of ferruginous sulphate of alumina. The results thus obtained have not been fully satisfactory, by reason of the time required to carry on the process and the incompleteness of the reduction of peroxide of iron thereby. I produce the deoxidation of the peroxide of iron present in such ferruginous solutions of sulphate of alumina by means of sulphurous acid or sulphureted hydrogen by passing said agents through a preferably hot solution of ferruginous sulphate which has been brought by mechanical means into a finely-divided condition or spray.

The following is a convenient method of practicing my invention, but it may be departed from without changing the nature of the same: One thousand pounds of 50° sulphuric or chamber acid is heated to, say, 180° Fahrenheit, and five hundred pounds of finely-divided bauxite is stirred in. A violent reaction will soon take place, and a small quantity of water will have to be added from time to time to prevent the mass from running over. After some time the reaction will cease, and the mass is then diluted with water or weak wash-liquors from previous operations to, say, about 25°, and the liquor is left to settle. After some days the clear supernatant liquor is drawn off, heated, and passed in a finely-divided condition through a closed vessel, which may have a cylindrical or other suitable form, and which will best be made from sheet-lead. This liquor may be injected in a fine spray into said vessel; or pieces of coke or old crockery or stones may be placed in said vessel, over which said liquor may be allowed to trickle. A stream of sulphurous-acid gas or of sulphureted-hydrogen gas is conducted into the vessel, and the solution of ferruginous sulphate of alumina is then brought into intimate contact with the reducing agent.

Should the reduction of peroxide of iron to protoxide not have been perfected in one operation, the liquors may be similarly treated a second time, or until all the peroxide of iron present is changed into the protoxide.

The deoxidizing properties of sulphurous acid or sulphureted hydrogen are well known, and I do not claim their use broadly.

Having thus described my invention, I claim—

The process of manufacturing a white sulphate of alumina or aluminous cake from ferruginous aluminous material, which consists in treating a solution of ferruginous sulphate of alumina in a finely-divided state or in spray with sulphurous acid or sulphureted hydrogen, for the purpose specified.

In testimony whereof I have hereunto signed my name this 7th day of June, A. D. 1881.

CONRAD SEMPER.

Witnesses:
W. C. STRAWBRIDGE,
J. BONSALL TAYLOR.